UNITED STATES PATENT OFFICE.

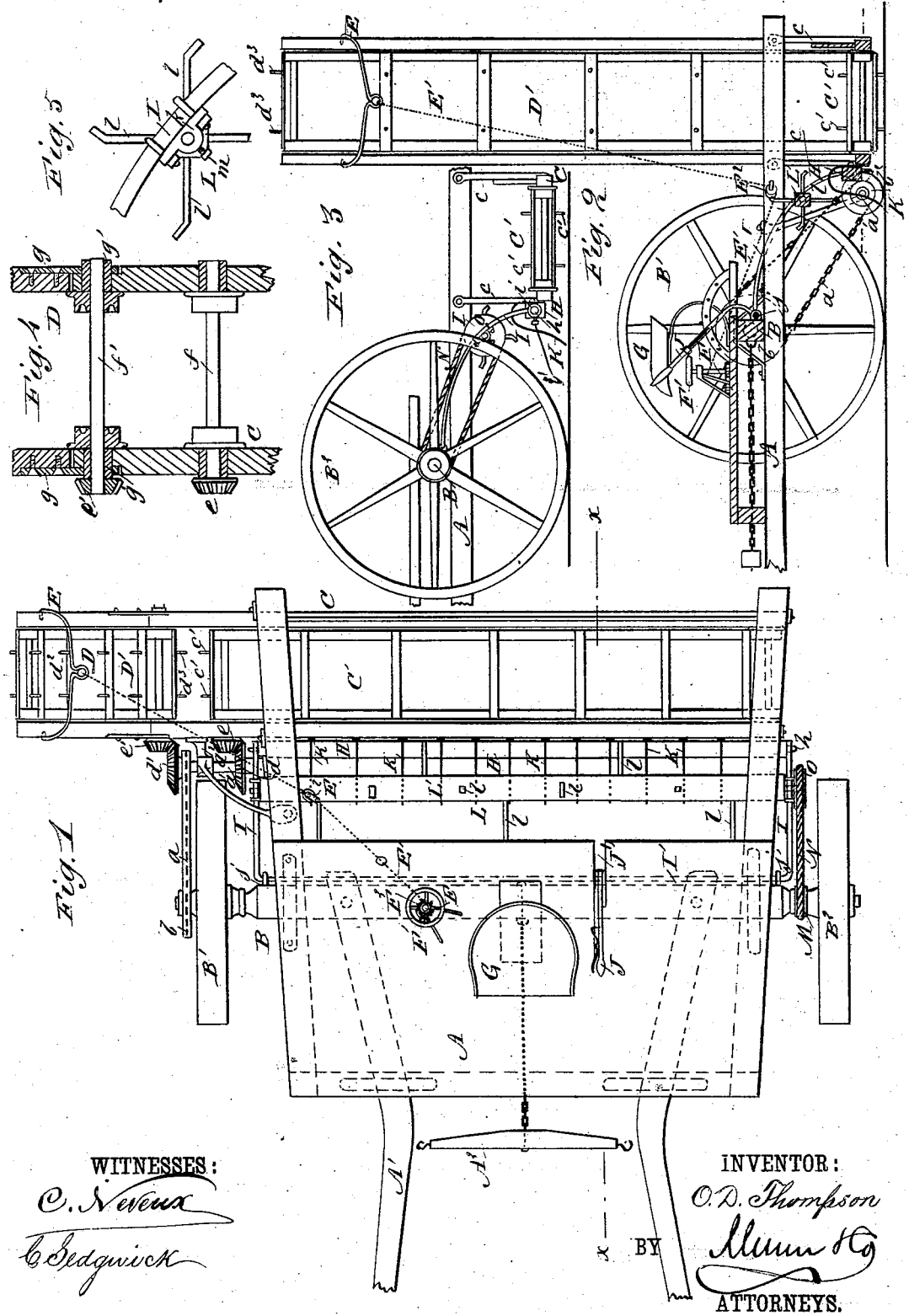

OTIS D. THOMPSON, OF ELKHART, INDIANA.

HAY RAKE AND LOADER.

SPECIFICATION forming part of Letters Patent No. 261,406, dated July 18, 1882.

Application filed April 25, 1882. (No model.)

*To all whom it may concern:*

Be it known that I, OTIS D. THOMPSON, of Elkhart, in the county of Elkhart and State of Indiana, have invented a new and Improved Hay Rake and Loader, of which the following is a full, clear, and exact description.

The object of this invention is to provide a new and improved machine for raking and loading hay into a wagon driven by the side of the machine without requiring the hay to be raked into windrows and cocking and loading it with a fork.

This invention has relation to improvements in hay rakes and loaders; and it consists in the combination and arrangement of parts, substantially as hereinafter more fully set forth.

Reference is to be had to the accompanying drawings, forming a part of this specification, in which similar letters of reference indicate corresponding parts in all the figures.

Figure 1 is a plan view of my improved hay rake and loader. Fig. 2 is a longitudinal sectional elevation of the same on the line $x$ $x$, Fig. 1, showing the inclined elevator raised. Fig. 3 is a longitudinal elevation of the rear part of the machine, showing the inclined elevator removed. Fig. 4 is a detail longitudinal sectional elevation of the longitudinal carrier and the hinged inclined elevator at the hinge-joint of the same. Fig. 5 is a detail end elevation of the rotary rake journaled in the stay-rods.

The frame A, provided with thills A' and whiffletree A² or other devices for propelling it, rests upon and is attached to an axle, B, journaled in the hubs of wheels B' B². The wheel B' has a sprocket-wheel, $b$, mounted on the outer end of its hub, over which sprocket-wheel a chain, $a$, passes, which also passes over a small sprocket-wheel on a short shaft, $a'$, journaled in a bracket, $a^2$, projecting from the outer surface of one of the longitudinal side bars at the end of the same, of a horizontal carrier, C, suspended by means of stay-rods $c$ from the frame A. On this shaft $a'$ are mounted two beveled cog-wheels, $d$ $d'$, of which the former, $d$, engages with a cog-wheel, $e$, mounted on one end of the shaft $f$, journaled near the end of the horizontal carrier C, over which shaft the endless carrier-belt C' passes, which is provided on its outer surface with a series of studs, $c'$ $c'$. The bevel cog-wheel $d'$ engages with a bevel cog-wheel, $e'$, mounted on the end of a shaft, $f'$, journaled in the end of the frame of the horizontal carrier C. An elevator-frame, D, has its lower end hinged to the end of the frame of the carrier C, the endless belt D' of the elevator D passing over the shaft $f'$ and over a shaft or roller at the upper end of this frame D. This belt D' is provided on its outer surface with a series of studs, $d^3$. Two plates or straps, $g$, are attached to the outer sides of the longitudinal side bars or rails of the elevator D at the ends, and are attached to tubular boxes $g'$ in the ends of the side bars of the frame of the carrier C, through which boxes $g'$ the shaft $f'$ passes, so that the elevator swings on a common center with its lower belt-shaft.

A bail, E, is pivoted to the upper end of the elevator D, and to this bail a rope or chain, E', is attached, which passes over a pulley, E², on the frame A, and from there passes to and is attached to a vertical windlass-shaft, F, journaled in the frame A, adjoining to the seat G, which shaft F is provided at its upper end with a hand-wheel, F', and is also provided with a ratchet-wheel, F², with which a pawl engages, pivoted on the top of the frame A. By means of this ratchet and pawl the shaft F can be locked in any position. By winding more or less of the rope or chain E' on the shaft E the outer or upper end of the elevator D can be raised more or less, as circumstances may require—that is, the inclination of the elevator can be adjusted by means of the chain or rope E' and the windlass-shaft F.

A bed timber or beam, H, is provided at each end with a pivot, $h$, passing into eyes $i$ at the lower ends of curved stay-rods I, passing through loops $j$ at the rear of the axle, and united at the upper ends by a rod, I', parallel with the axle $h$, to which rod I' a handle-lever, J, is attached, passing through a slot, J', in the platform A at the side of the seat G, the lever J being at one side of the seat and the windlass-shaft F at the other side.

The lever J is provided with devices for locking it in any desired position.

The loops or eyes $i$, at the lower ends of the curved stay-rods I, are provided with set-screws $i'$, for locking the bed timber or beam H at any desired inclination. This bed timber or beam H is held parallel with the axle and a short distance from the ground. A series of teeth, K, made of metal strips or rods, are attached by means of screws to the rear side of the beam or head H, and are curved over the top of the beam, and project down on the front of the same to near the ground.

A rotary rake, L, is pivoted in boxes $k\,k$, attached to the curved stay-rods I, so that it will be parallel with the beam or head H, this rake being formed of a bar, L', provided with a series of radial teeth, $l$, having the ends bent reversely to their direction of rotation.

The hub of the wheel $B^2$ is provided with a grooved pulley, M, over which a belt or endless rope passes to and over a grooved pulley, O, on the beam L'.

The operation is as follows: The elevator D is inclined more or less, as may be necessary. The short shaft $a'$ is rotated by the chain $a$, thereby operating the belts C' and D' of the horizontal carrier C and the inclined elevator D. The beam H is adjusted so that the lower ends of the teeth K are near the ground. The hay passes up these teeth K, and is seized and thrown upon the carrier-belt C' by the rotary rake L. The hay does not catch on the teeth of the rake L, as the ends of the teeth are bent reversely to the direction of the rotation of the rake L. The hay is carried by the belt C' to the end of the carrier C, and is carried by the belt D' up the elevator D into the wagon. By means of the lever J the bed rail or beam H can be raised from the ground in going to and from the field. The teeth K are made elastic, so that they can follow the irregularities of the ground.

If the machine is to be used as an ordinary dump-rake, the elevator is removed and the rotary rake L is locked or fixed in position by means of the set-screws $m$ in the boxes $k$. The hay or straw cannot pass over the teeth K, but will be retained by the same in the same manner as in a dump-rake or sulky-rake, the bed rail or beam H being raised by means of the lever J to dump the raked hay.

Having thus described my invention, I claim as new and desire to secure by Letters Patent—

1. In a hay rake and loader, the combination, with the platform A, of the horizontal carrier C, the curved stay-rods I, provided with loops $i$ at the ends, the rake-head H, provided at the ends with pivots passing into the eye $i$, the binding-screw $i'$ in the eyes $i$, and the rake-teeth K on the head H, substantially as herein shown and described, and for the purpose set forth.

2. In a hay rake and loader, the combination, with the horizontal carrier C, of the elevator D, the shaft $f'$, the tubular boxes $g'$, through which this shaft $f'$ passes, and the plates $g$, attached to the tubular boxes $g'$, and the ends of the side bars of the elevator D, substantially as herein shown and described, and for the purpose set forth.

3. The combination, with the platform A, of the horizontal carrier C, the curved stay-rods I, provided with loops $i$, the rake-head H, provided at the ends with pivots passing into the loops $i$, screws $i'$, the rake-teeth K on head H, and rotary rake L, having bent teeth $l$ hung upon the rods I, substantially as and for the purpose set forth.

4. In a hay rake and loader, the combination, with the horizontal carrier C, of the elevator D, the shaft $f'$, the tubular boxes $g'$, forming bearings for shafts $f'$, the plates $g$, attached to the boxes $g'$, and the ends of the side bars of the elevator D, and the bail E, with its rope or chain E' passed in contact with a pulley, $E^2$, on the frame of the platform A, and connected to a hand-wheel or lever-shaft, F F', located upon said platform near the driver's seat, substantially as and for the purpose specified.

OTIS D. THOMPSON.

Witnesses:
WM. AXTELL,
BENJAMIN O. MANCHESTER.